July 31, 1956  A. H. MORGENSTERN  2,756,763
AUTOMATIC AIR VALVE ARRANGEMENT FOR PREVENTING
THE SUCKING OFF OF ODOR SEALS AND DRAINS
Filed Feb. 3, 1955

INVENTOR
A. H. MORGENSTERN
By Bryant & Lowry
ATTYS.

United States Patent Office 2,756,763
Patented July 31, 1956

2,756,763

AUTOMATIC AIR VALVE ARRANGEMENT FOR PREVENTING THE SUCKING OFF OF ODOR SEALS AND DRAINS

Arno Hugo Morgenstern, Frankfurt am Main, Germany

Application February 3, 1955, Serial No. 485,995

Claims priority, application Germany February 5, 1954

5 Claims. (Cl. 137—217)

The invention relates to valves, and more specifically to an automatic air valve arrangement for preventing the sucking off of odor seals and drains, wherein a housing is provided with an air admission aperture and a ventilation pipe connection between which and connected thereto by a passage a valve is located which opens or closes in the event of a vacuum occurring in the drain.

The known valves of this type are laterally accessible from outside and easy to open, so that they can be tampered with by unauthorized persons and the air valve arrangement put out of action. Furthermore, a backwash surge unexpectedly occurring in the drain can shift the valve in its housing out of position and thus render it temporarily inoperative.

An object of the invention is to overcome these objections and to provide an air valve arrangement which after being assembled cannot be opened, and the internal parts thereof cannot be tampered with from outside. According to the invention a backwash safety device in the form of a backwash valve or the like, is provided in a passage arranged between a housing valve and a ventilation pipe connection, and in its initial position forms an air passage leading to the ventilation pipe connection, but in its operative position closes the passage leading to the housing valve.

Other objects and advantages of the invention will be apparent from the description set out below when taken in connection with the accompanying drawing wherein—

Figure 1:
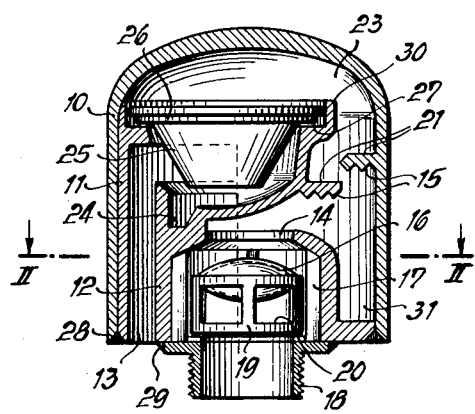
Fig. 1 is a longitudinal section through the air valve arrangement.

The air valve arrangement consists of a beaker or dome-shaped housing 10 containing an insertion 11, 12. This insertion is soldered or otherwise permanently connected with the housing 10 flush with the edge thereof. A mushroom-type valve or in the construction illustrated a cone or housing valve 25 having a flange 26 is accommodated in the insertion 11, 12 near the top of the housing 10 so that the flange 26 rests loosely on a valve seat 27 formed in the insertion 11, 12. The valve seat 27 has an upward extension 30 freely surrounding the valve 25 on order to prevent it from being washed out in the event of a backwater surge occurring in the interior of the housing 10 from the ventilation pipe connection 18 screwed into the drain pipe.

The housing valve 25 is located in a passage 13, 23 extending near the edge of the housing from an air admission aperture to a backwash valve 16 and to the ventilation pipe connection 18 situated thereunder. The portion 13 of the passage leading from the air admission aperture to the housing valve 25 is formed by a bore in the insertion 11, 12, whereas the portion 23 of the passage between the housing valve 25 and the backwash valve 16 is formed by a space between the insertion 11, 12 and the wall of the housing 10. This space 23 also accommodates laterally projecting baffles 21 with corrugated surface 15, so as to give any vapors which may escape from the pipe connection 18 an opportunity of and space for condensing and the deposit therefrom will collect in a well 31 in the space 23. The backwash valve 16 has a guide cylinder 19 with openings 20 and is axially movable in a valve cage of the insertion 11, 12 directly above the point where the ventilation pipe connection 18 is fixed on the insertion 11, 12. The references 29 and 28 designate soldered joints.

Figure 2:
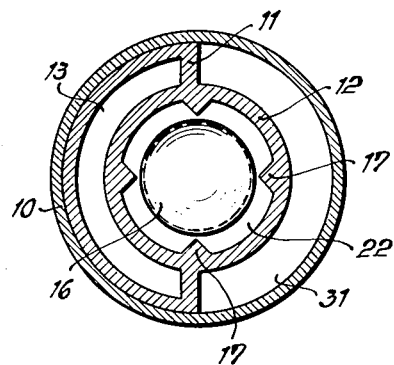
Fig. 2 is a section on line II—II of Fig. 1.

As said before the air valve arrangement is to be screwed into a screw-threaded bore, for example of a drain pipe by means of its ventilation pipe connection 18. Now without the air valve arrangement, the odor seal which closes the drain pipe would be emptied as soon as a vacuum occurs in the drain pipe. The invention avoids this draining off. The vacuum causes the outer air to enter the passage portion 13 over a large area (Fig. 2) through the air admission aperture and to lift the housing valve 25 and reach the backwash valve 16. This is normally always in open position (see Fig. 1). The valve cage of the backwash valve 16 has radially directed longitudinal ribs 17 with the result that a space 22 is formed between the backwash valve 16 and the wall of the valve cage. The sucked-in air penetrates this space 22 and passes freely through the openings 20 in the valve guide cylinder 19 into the ventilation pipe connection 18 and thence into the drain pipe, so that the odor seal cannot be sucked dry.

If, on the other hand, a backwater surge should occur in the drain pipe, the float or backwash valve 16 will immediately be lifted by the water entering through the ventilation pipe connection and bears against its valve seat 14 so that the water cannot enter the portion 23 of the passage. When the backwash surge diminishes the float or backwash valve 16 again opens so that air can once more be sucked in, should a vacuum occur in the drain pipe.

A trough 24 is also provided below the valve 25 and communicates with the portion 13 of the passage. Any drops of water which may be left behind when the valve opens cannot pass out of the air admission aperture but collect in this trough 24 and evaporate.

The air valve is no longer accessible from outside as only the admission aperture is provided from which failure of the housing valve 25 cannot occur.

It will, of course, be understood that various details of construction may be varied through a wide range without departing from the principles of this invention and it is, therefore, not the purpose to limit the patent granted hereon otherwise than necessitated by the scope of the appended claims.

I claim.

1. An automatic air valve arrangement for preventing the sucking-off of odor seals and drains, comprising a housing provided with an air admission aperture and a ventilation pipe connection interconnected by a passage, a valve operative under vacuum to open position arranged in said passage, a backwash safety device in the form of a second valve in said passage between said first valve and said ventilation pipe connection and said second valve in its initial position forming an air passage but in its operative position closes the passage leading to the first mentioned valve, the wall of the housing being imperforate and shaped like a beaker with its free edge extending downwardly at least to the height of the ventilation pipe connection.

2. A valve arrangement as in claim 1, wherein an insertion is mounted in the beaker-shaped housing and permanently connected to the edge thereof and said valves being mounted in the insertion.

3. A valve arrangement as set forth in claim 1, wherein an insertion is mounted in the beaker-shaped housing and permanently connected to the edge thereof, said valves being mounted in the insertion, and the passage leading from the air admission aperture to the ventilation pipe connection extending through the insertion from the edge thereof to the first mentioned valve and from this valve to the valve seat of the other valve through the space between the insertion and the wall of the beaker-shaped housing.

4. A valve arrangement as set forth in claim 2, wherein the portion of the passage leading from the air admission aperture to the first mentioned valve terminates in a trough underneath this valve to catch any drops of water draining out of the valve and allowing them to evaporate.

5. A valve arrangement as set forth in claim 1, wherein the portion of the passage between the two valves is provided with baffles having corrugated undersurfaces.

References Cited in the file of this patent
UNITED STATES PATENTS

| | | |
|---|---|---|
| 926,968 | Stickdorn | July 6, 1909 |
| 1,505,695 | Boyd | Aug. 19, 1924 |
| 1,637,076 | Heil | July 26, 1927 |
| 1,724,878 | Jensen | Aug. 13, 1929 |